(12) United States Patent
King

(10) Patent No.: US 9,643,574 B2
(45) Date of Patent: May 9, 2017

(54) APPARATUS AND METHOD FOR AUTOMATED ENERGY STORAGE DEVICE EXCHANGE AND RAPID CHARGING

(71) Applicant: GENERAL ELECTRIC COMPANY, Schenectady, NY (US)

(72) Inventor: Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 14/699,173

(22) Filed: Apr. 29, 2015

(65) Prior Publication Data

US 2016/0318487 A1   Nov. 3, 2016

(51) Int. Cl.
*B60S 5/06* (2006.01)
*B60L 11/18* (2006.01)
*B60K 1/04* (2006.01)

(52) U.S. Cl.
CPC ...... *B60S 5/06* (2013.01); *B60K 1/04* (2013.01); *B60L 11/185* (2013.01); *B60L 11/1822* (2013.01); *B60L 11/1877* (2013.01); *B60K 2001/0477* (2013.01)

(58) Field of Classification Search
CPC ..... B60S 5/06; B60K 1/04; B60K 2001/0477; B60L 11/1822; B60L 11/1877; B60L 11/185

USPC ........................................................ 320/109
See application file for complete search history.

(56) References Cited

U.S. PATENT DOCUMENTS

| 5,612,606 | A | 3/1997 | Guimarin et al. | |
|---|---|---|---|---|
| 5,620,057 | A * | 4/1997 | Klemen et al. | B60K 1/04 180/65.1 |
| 2009/0058355 | A1 | 3/2009 | Meyer | |
| 2015/0033537 | A1 * | 2/2015 | Poillot et al. | B60K 1/04 29/428 |

* cited by examiner

*Primary Examiner* — Sun Lin
(74) *Attorney, Agent, or Firm* — John A. Kramer; Global Patent Operation

(57) ABSTRACT

An apparatus for energy storage device exchange includes a central pillar; a first carrier that is mounted on the central pillar for motion generally parallel to and around a generally vertical working axis, and that is configured to engage a lifting structure of an energy storage device; at least one motor; and a controller configured to operate with the at least one motor to: rotate the first carrier around the working axis to a removal position adjacent to the lifting structure of the energy storage device mounted on a vehicle; engage the first carrier with the lifting structure and lift the energy storage device generally along the working axis; rotate the first carrier around the working axis to a deposit position adjacent to an energy storage device receptacle; and lower the first carrier generally along the working axis to deposit the energy storage device at the energy storage device receptacle.

21 Claims, 10 Drawing Sheets

APPARATUS AND METHOD FOR AUTOMATED ENERGY STORAGE DEVICE EXCHANGE AND RAPID CHARGING

BACKGROUND

Technical Field

Embodiments of the invention relate generally to vehicles powered by stored energy. Particular embodiments relate to the exchange, replacement, or recharging of energy storage devices provided for such vehicles.

Discussion of Art

Generally, zero-emissions vehicles, e.g., vehicles driven by power sources that do not require combustion, are desirable for enhancing cleanliness of air surrounding the pathways traveled by such vehicles. Zero-emissions vehicles are particularly desirable for use in underground mining operations, in which breathable air is a limited and invaluable resource. In this context, a "zero emissions" vehicle is one that during its operation does not reduce the availability of breathable air in its vicinity.

Gallery mines can extend as deep as two miles vertically and for many miles horizontally. Although elevators in vertical shafts may be used for lifting ore up from the sub-levels of a mine, and for raising and lowering mine crew personnel, it is prohibitively expensive to put vertical shafts all along a miles-long gallery. Accordingly, vehicles are used to haul the ore and/or mine crew along the galleries to and/or from the extraction shafts. As the extent of a typical gallery mine renders ventilation challenging, it is desirable for such vehicles to have minimal emissions so as to maximize the breathable air available to the mine crew. Presently, some ore haulers are built with engines certified to "Tier 3" emissions standards. However, it would be more desirable to build these hauler vehicles as zero-emissions vehicles (e.g., electric powered) so as to avoid any additional ventilation loading from their operation.

Battery powered vehicles already are available for crew transport within mines. For cost reasons, battery-charging stations can be provided only in selected areas of a mine, typically close to an extraction shaft. Battery powered crew transport vehicles are often able to sit at these charging stations for extended periods given the relative infrequency of crew transport. This relatively high availability for charging enables lower power draw and thereby reduces the equipment and operational costs of recharging battery powered crew transport vehicles. While recharging crew transport vehicles is often practical, recharging other electric mining vehicles, such as an ore-hauler, is potentially problematic.

More specifically, mine operations are budgeted to have ore hauler vehicles in near-continuous motion, pausing only to load and unload. Loading locations are continuously moving as the work face advances or retreats, therefore, it is not feasible to provide for battery charging at loading locations. During unloading, an ore hauler vehicle is subject to large and somewhat unpredictable mechanical loads.

Additionally, each ore hauler vehicle is scheduled to clear loading and unloading locations as rapidly as possible so that a next ore hauler can begin to load or dump. But the high capacity batteries essential to powering an ore hauler, which must transport loads far heavier than a few crewmembers, would take a long time to recharge even at relatively high electrical power (e.g., on the order of thousands of watts). For at least this additional reason, loading and unloading locations are not optimal locations for recharging an ore hauler vehicle battery.

Moreover, use of battery powered ore hauler vehicles would require scheduling an additional stop or detour along the haul route to permit for battery recharge in a location away from loading, hauling, and unloading operations. Sidetracking an ore hauler, however, results in excessive time not accomplishing its intended uses of loading, hauling, and unloading. Excessive off-task time has been an obstacle to the adoption of battery powered hauler vehicles, which would otherwise be desirable.

In view of the above, it may be desirable to provide apparatuses and methods for exchanging, replacing, and/or recharging an energy storage device of a zero-emission vehicle, such that it might become feasible to utilize battery powered ore hauler vehicles in underground mines. Such apparatuses and methods might also be helpful toward increasing utilization of battery powered crew transporters.

BRIEF DESCRIPTION

In an embodiment, an apparatus for energy storage device exchange includes a central pillar, a first carrier, at least one motor, and a controller. The first carrier is mounted on the central pillar for motion around a generally vertical working axis, and is configured to engage a lifting structure of an energy storage device. The controller is configured to operate with the at least one motor to: rotate the first carrier around the working axis to a removal position adjacent the lifting structure of a vehicle-mounted energy storage device; engage the first carrier with the lifting structure and lift the energy storage device generally along the working axis; rotate the carrier around the working axis to a deposit position adjacent an energy storage device receptacle; and lower the first carrier generally along the working axis to deposit the energy storage device at the energy storage device receptacle.

In another embodiment, an apparatus includes a coupling interface, mounted to a vehicle, that includes a first interface surface having a first shape, a second interface surface having a different shape from the first surface, and an intermediate interface surface connecting the first and second surfaces, with at least one first energy transfer connector formed in and/or disposed on one or more of the first, second, or intermediate interface surfaces. The coupling interface is configured to allow an automated energy storage device exchange apparatus external to the vehicle to remove and install an energy storage device having device surfaces that matingly correspond to the coupling interface surfaces, such that the energy storage device may be electrically disengaged and removed from the coupling interface via a first motion that brings the first device surface adjacent to the second interface surface, followed by a second motion that is generally orthogonal to the first motion.

In another embodiment, an apparatus includes a charging stand that includes at least one recharge connector for connecting first and second storage devices to a power source, consequent to depositing either of the energy storage devices onto the charging stand. (The charging stand may accommodate one energy storage device at a time, or multiple energy storage devices at a time.) The apparatus further includes a central pillar, a first carrier, and a second carrier. The pillar is adjacent the charging stand and has a generally vertical working axis. The first carrier is movably mounted on the central pillar for rotation about the axis of the central pillar, and is configured to engage lifting structures of the energy storage devices. The second carrier is movably mounted on the central pillar, at a location circumferentially displaced from the first carrier, for rotation about the axis, and is configured to engage the lifting structures of the energy storage devices. The apparatus further includes at least one motor, and a controller configured to operate with the at least one motor to: rotate the first carrier to a pickup position adjacent the lifting structure of the first energy storage device mounted at the charging stand; rotate the second carrier to a removal position adjacent the lifting structure of the second energy storage device mounted on a vehicle; engage the first carrier with the lifting structure of the first energy storage device and engage the second carrier with the lifting structure of the second energy storage device; lift the first and second carriers to respectively pick up the first energy storage device from the charging stand and remove the second energy storage device from the vehicle; rotate the first carrier to an install position adjacent the vehicle and rotate the second carrier to a deposit position adjacent the charging stand; and lower the first and second carriers to respectively install the first energy storage device onto the vehicle and deposit the second energy storage device onto the recharge connector of the charging stand.

DRAWINGS

The present invention will be better understood from reading the following description of non-limiting embodiments, with reference to the attached drawings, wherein below:

DETAILED DESCRIPTION

Figure 1:
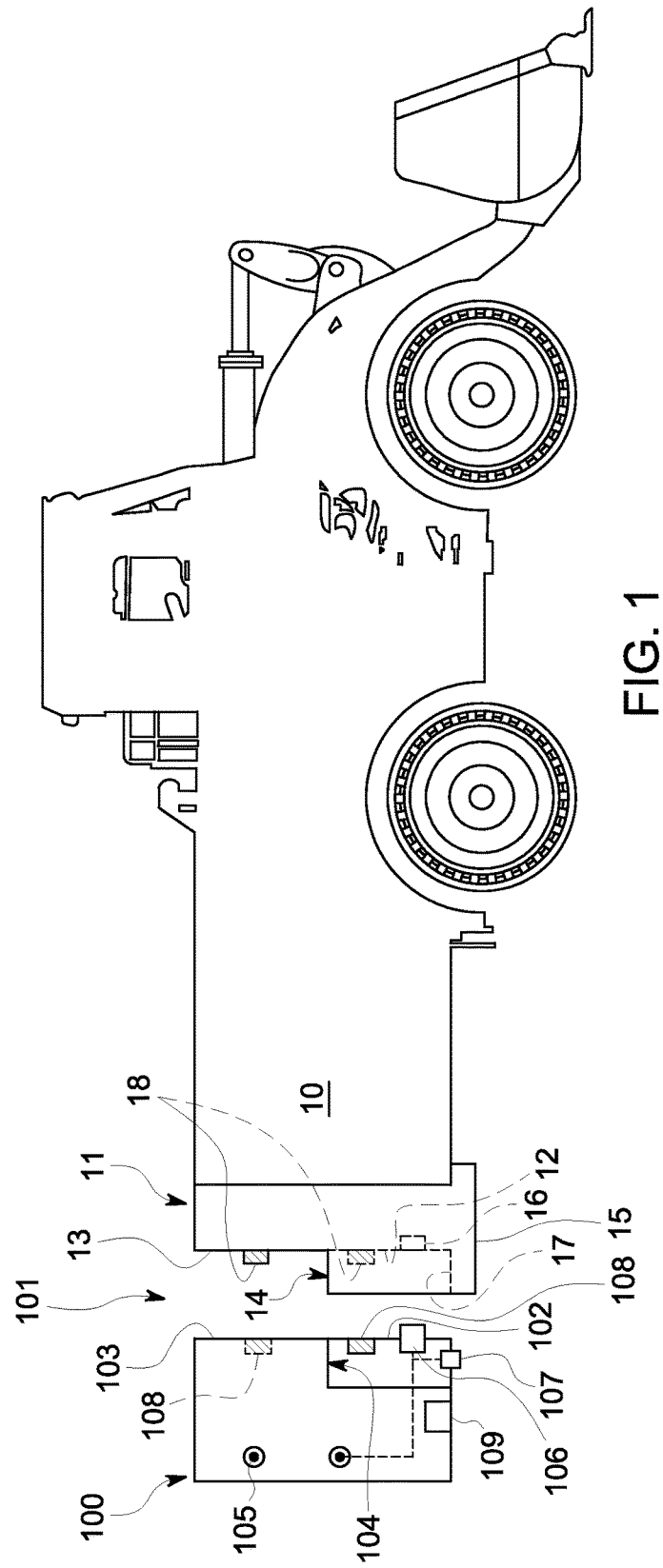
FIG. 1 is a side schematic view of an energy storage device and a coupling interface according to an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to electrochemical batteries or electrolytic capacitors installed in mining vehicles, embodiments of the invention also are more generally applicable for exchanging and recharging batteries that are installed in movable assets. As used herein, the term "stored-energy vehicle" refers to vehicles that, at least in part, utilize a power source that does not require combustion. As used herein, "batteries" refer generally to energy storage devices such as electrochemical cells, electrolytic capacitors, capacitors, red/ox canisters, pneumatic cylinders, and the like.

Embodiments of the invention are intended to provide for automated swapping and rapid opportunity charging of batteries that are installed onto stored-energy vehicles to permit zero-emission operations of those vehicles.

In an exemplary embodiment, as shown in FIG. 1, a vehicle 10 has at an outward surface (e.g., its back end) a coupling interface 11. The coupling interface 11 provides mechanical features and energy transfer connectors (e.g., electrical, pneumatic, or fluid connectors) for rapidly detachably mounting an energy storage device 100 (e.g., an electrochemical, capacitive, compressed air, or other stored energy reservoir) onto the vehicle 10. The mechanical features of the coupling interface 11 may include, for example, a first surface 12 that is of a concave cylindrical shape about a generally vertical axis disposed somewhere vehicle-rearward from the coupling interface 11. Above and adjacent to the first surface 12 is a second surface 13 that is of a different shape from the first surface, e.g., a generally planar shape. The first and second surfaces 12, 13 are connected via one or more intermediate surfaces 14, e.g., a pair of generally horizontal or gently sloped ledges that protrude vehicle-rearward from the generally planar upper surface 13 to lateral vertices of the generally vertical concave cylindrical surface 12. The mechanical features of the coupling interface 11 may also include: a foot 15, which has at its upper side a ledge 17 that closes off a chord of the lower end of the concave cylindrical surface 12; and a detent slot 16, which is indented vehicle-forward into the concave cylindrical surface 12.

The energy transfer connectors of the exemplary coupling interface 11, as shown in FIG. 1, include upper and lower electrical connectors 18, which are fastened at their upper ends to internal wiring (not shown) of the coupling interface 11. Illustration of electrical connectors does not preclude embodiments having pneumatic or other fluid connectors, e.g., quick disconnects. The electrical connectors 18 may be fastened by bolted connections for ease of replacement. The electrical connectors 18 may be, for example, live-hinge, leaf, or brush-type connectors. As shown in FIG. 1, the upper electrical connector 18 is disposed on the generally planar second surface 13 whereas the lower electrical connector 18 is disposed on the concave cylindrical first surface 12, however, any or all electrical connectors may be disposed on or distributed among either or both of the first and second surfaces 12, 13.

Figure 2:
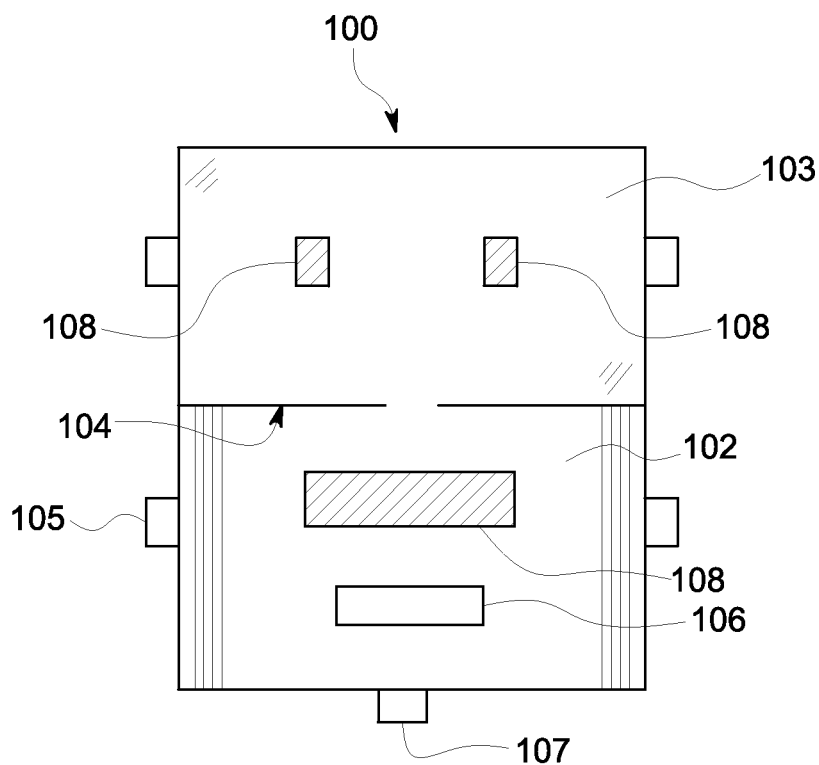
FIG. 2 is a front schematic view of the energy storage device of FIG. 1.
Figure 3:
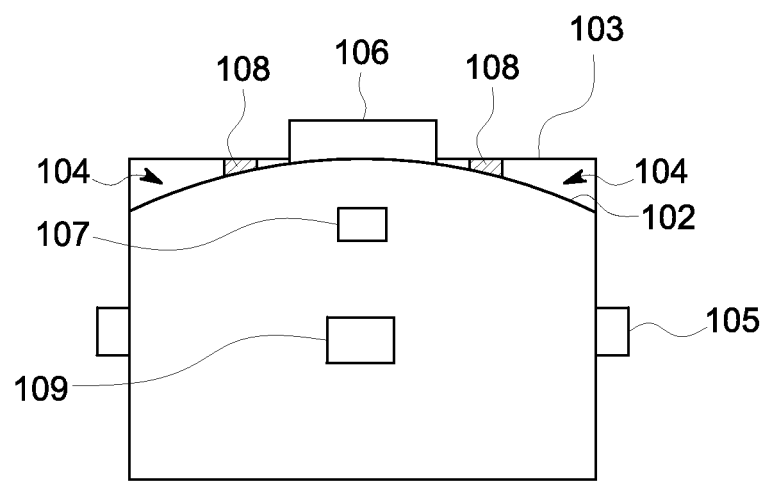
FIG. 3 is a bottom schematic view of the energy storage device of FIG. 1.

Referring now to FIGS. 1-3, the energy storage device 100 includes an interface 101 that has mechanical features and energy transfer connectors that are complementary to those of the coupling interface 11. Thus, the interface 101 configures the energy storage device 100 for rapid detachable mounting onto the vehicle 10 via the coupling interface 11. FIG. 1 shows the interface 101 in side view, FIG. 2 shows the interface in front view, and FIG. 3 shows the interface from its lower end.

More particularly, the interface 101 includes a first surface 102, a second surface 103, and an intermediate surface 104, each of these surfaces shaped complementary to the corresponding surfaces 12, 13, 14 of the coupling interface 11. Thus, the first surface 102 is generally convex cylindrical about a generally vertical axis, which is aligned to the generally vertical axis of the coupling interface first surface 12 when the energy storage device interface 101 is coupled with the coupling interface 11. The second surface 103 is generally planar. The intermediate surface 104 is a pair of generally horizontal or gently sloped ledges that are indented from the generally planar second surface 103 to the lateral vertices of the first surface 102.

The energy storage device interface 101 also includes a lifting structure 105 that is disposed generally opposite the first, second, and intermediate surfaces 102, 103, 104 that are formed on the side of the energy storage device 100 that faces the coupling interface 11. In other words, the lifting structure 105 is disposed proximate a vehicle-rearward surface of the energy storage device 100.

The interface 101 also includes at least one detent tab 106, which in the example shown in FIG. 1 can be protruded from the convex cylindrical surface 102 to engage into the detent slot 16 of the coupling interface 11. For example, the detent tab 106 may be a spring-loaded pin, which can be retracted simply by exerting transverse force sufficient to overcome the spring load, according to conventional detent mechanisms. Alternatively, as shown in FIG. 1, the interface 101 also may include an actuator 107, which is mechanically and/or electrically connected with the lifting structure 105 and with the detent tab 106. The actuator 107 may be configured to retract and/or protrude the detent tab 106. For example, the actuator 107 may be configured to operably link the lifting structure 105 to the detent tab 106, so as to cause the detent tab 106 to retract into the convex cylindrical first surface 102, in response to an upward force exerted on the lifting structure. As another example, the actuator 107 may be operably linked to the detent tab 106, so as to cause the detent tab to protrude from the convex cylindrical first surface 102, in response to an upward force exerted on the actuator itself, e.g., by contact against the ledge 17 that is formed by the coupling interface foot 15. A general benefit or purpose of the detent tab 106 is to engage with the detent slot 16 that is formed in the coupling interface 11, so as to prevent unintended removal or temporary displacement of the energy storage device 100 from its installed position in which the energy transfer connectors 18, 108 are matingly engaged. In certain embodiments, the functionality of the detent tab 106 and slot 16 may be incorporated into the energy transfer connectors 18, 108 or into a configuration of some or all of the complementary surfaces 12, 13, 14 and 102, 103, 104, for example as further discussed below with reference to FIGS. 9-11.

Referring still to FIG. 1, the energy storage device 100 includes second energy transfer connectors 108 (e.g., electrical pads or contacts) that are formed in or disposed on at least one of the first, second, or intermediate surfaces 102, 103, 104. For example, FIG. 1 shows that two second energy transfer connectors 108 are provided, one on the upper generally planar second surface 103, and another on the lower generally convex cylindrical first surface 102. With reference to their respective surfaces 102 and 103, the second energy transfer connectors 108 are configured and positioned to come into mutual electrically connecting contact as the energy storage device 100 is placed onto the coupling interface 11 to matingly engage the complementary surfaces 12, 102, 13, 103, 14, 104. The energy storage device 100 also may include a recharge connector 109, further discussed below with reference to FIG. 6.

Figure 4:
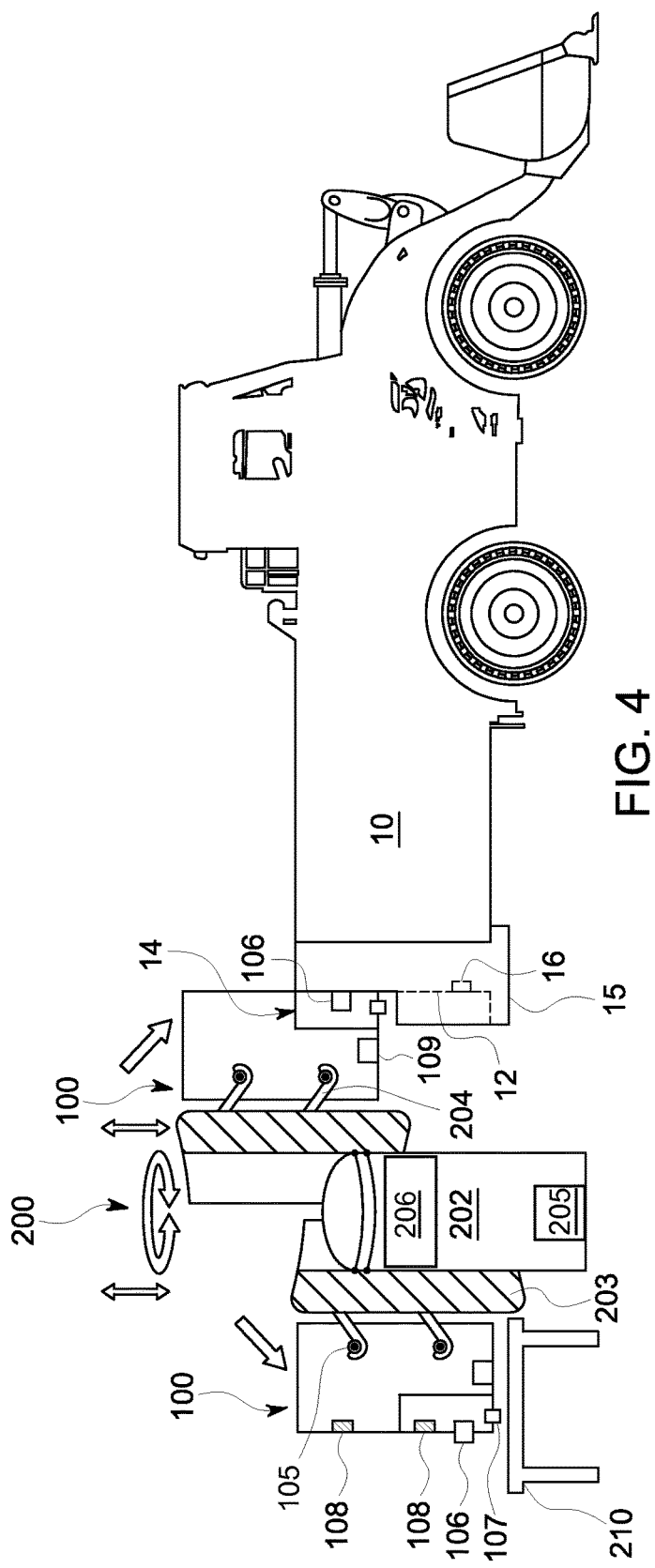
FIG. 4 is a side schematic view of the energy storage device and the coupling interface of FIG. 1 in combination with an energy storage device exchange apparatus according to another embodiment of the invention.

Referring now to FIG. 4, the energy storage device 100 is provided with the lifting structures 105 so that an automated or semi-automated energy storage device exchange apparatus 200 can lift the energy storage device 100 from the coupling interface 11 and move the energy storage device onto or into an off-board platform or other energy storage device receptacle 210. The energy storage device exchange apparatus 200 includes a central post or pillar 202, one or more carriers 203 that are movably mounted on the central pillar, and arms 204 that extend from each carrier 203 to engage with the lifting structures 105 of the energy storage device 100. The central pillar 202 may be rotatable about a generally vertical axis (a "working axis") with reference to the ground or mounting surface, and/or the carriers 203 may be rotatably movable around the working axis of the central pillar 202. Also, either the central pillar 202 may be vertically extensible and retractable from and toward the mounting surface (i.e., it can move up and down), and/or the carriers 203 may be linearly movable along the working axis of the central pillar 202 (i.e., can move up and down). Furthermore, the arms 204 may be rigidly extended from the carriers) 203, or may be movably extensible and retractable from and toward the carrier(s) 203.

The energy storage device exchange apparatus 200 also includes at least one motor 205 as well as a controller 206 that is configured to coordinate movement of the central pillar 202, the carrier(s) 203, and the arms 204 (collectively, the "working parts") so as to: rotate the carrier 203 around the working axis to a removal position adjacent the lifting structure of a vehicle-mounted energy storage device 100; engage the carrier 203 with the lifting structure 105 and lift the energy storage device 100 generally along the working axis (and thereby remove the energy storage device from the vehicle); rotate the carrier 203 around the working axis to a deposit position adjacent the energy storage device receptacle 210; and lower the carrier 203 generally along the working axis to deposit the energy storage device 100 at or on or into the energy storage device receptacle 210.

The controller 206 also is configured to coordinate movement of the working parts so as to rotate the carrier 203 around the working axis to a pickup position adjacent the energy storage device receptacle 210; engage the carrier 203 with the lifting structure 105 of a replacement energy storage device 100 and lift the replacement energy storage device 100 generally along the working axis; rotate the carrier 203 around the working axis to an install position adjacent the vehicle coupling interface 11; and lower the carrier 203 generally along the working axis to install the replacement energy storage device 100 onto the vehicle coupling interface 11.

Advantageously, the complementary convex and concave shapes of the energy storage device first surface 102 and of the coupling interface first surface 12 enable the energy storage device exchange apparatus 200 to lift the energy storage device 100 only partway along the working axis (less than a full height of the coupling interface 11) before rotating the carrier 203 to bring the energy storage device 100 from the removal position to the deposit position. Such a partial lift and rotation is possible because the convex shape of the energy storage device first surface 102 enables it to clear the corners of the generally planar second surface 13 that is formed on the coupling interface 11. Thus, the energy storage device exchange apparatus 200 can move the carrier 203 upward along the working axis in a first motion to bring the first device surface 102 away from the first interface surface 12, across the second interface surface 13; then pivot the carrier 203 around the working axis in a second motion that is generally orthogonal to the first motion and displaces the first device surface 102 from the second interface surface 13.

Figure 8:
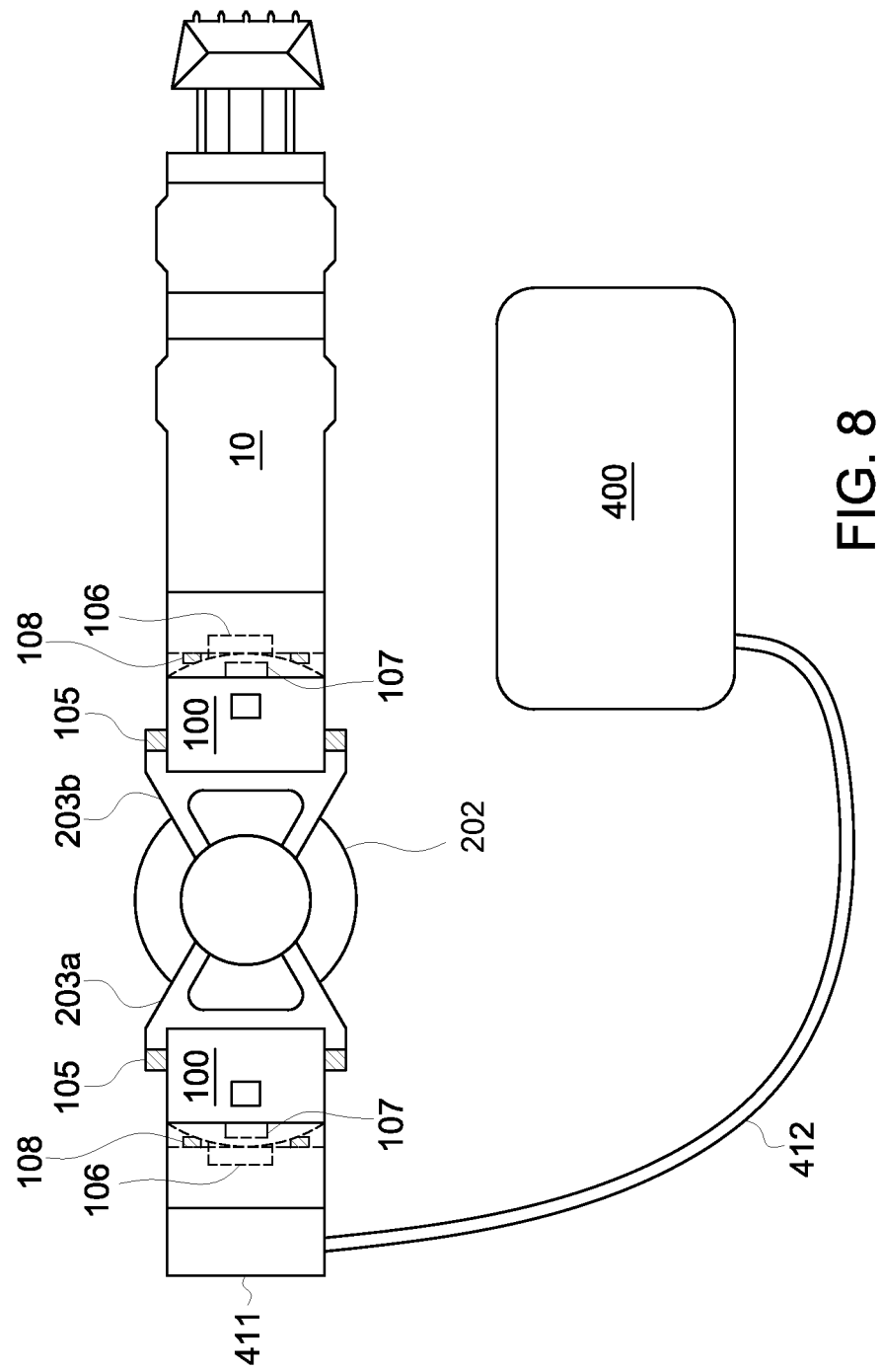
FIG. 8 is a top schematic view of the energy storage device, the coupling interface, the energy storage device exchange apparatus, the remote recharge apparatus, and the recharge coupling interface of FIG. 7.

In some embodiments, with additional reference to FIG. 8, the energy storage device exchange apparatus 200 may include at least one additional or second carrier 203 (see, e.g., second carrier 203*b* in FIG. 8) that also is mounted on the central pillar 202 at a position circumferentially spaced from the first carrier 203 (see, e.g., first carrier 203*a* in FIG. 8) and that is movable and configured like the first carrier 203. In such embodiments, the controller 206 is configured to synchronize movement of the first and second carriers 203. For example, the controller 206 may include a mechanical transmission that is connected to operably link the first and second carriers 203 to the at least one motor 205 for coordinated rotating, raising, and lowering motions of the first and second carriers 203. According to one aspect, such a configuration of dual carriers 203 (e.g., spaced 180 degrees apart on the pillar 202, as shown in FIG. 8) allows the apparatus 200 to generally concurrently lift a depleted energy storage device from the vehicle and lift a charged energy storage device from the off-board receptacle, then generally concurrently rotate the depleted energy storage device into alignment with the off-board receptacle and the charged energy storage device into alignment with the vehicle coupling interface, and then generally concurrently lower the depleted energy storage device onto the off-board receptacle for charging and lower the charged energy storage device for operable engagement (engaged electrical and mechanical connections) with the vehicle. Assuming the energy storage devices are approximately the same weight (which will typically be the case), it also allows for increased stability of the apparatus 200, since the energy storage devices will generally balance.

Figure 5:
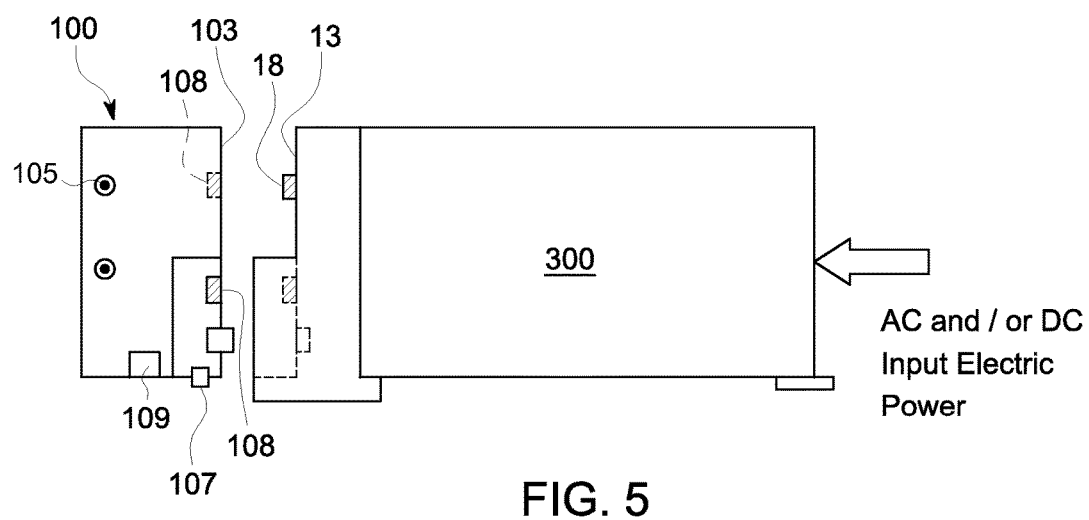
FIG. 5 is a side schematic view of the energy storage device of FIG. 1 in combination with a rapid recharge apparatus according to another embodiment of the invention.

FIG. 5 shows an implementation of a rapid opportunity charger apparatus 300, which converts AC and/or DC input electrical power to recharge an energy storage device 100 that is installed onto a coupling interface 11. For example, the rapid opportunity charger apparatus 300 may be a device such as an electrical power converter, an electrically powered air compressor, or an electrolysis plant for providing separate streams of fuel and oxidizer to the energy storage device 100 for installation onto a fuel cell-powered vehicle. The rapid opportunity charger apparatus 300 may, in some embodiments of the invention, be installed alongside or as the energy storage device receptacle 210 shown in FIG. 4.

Figure 6:
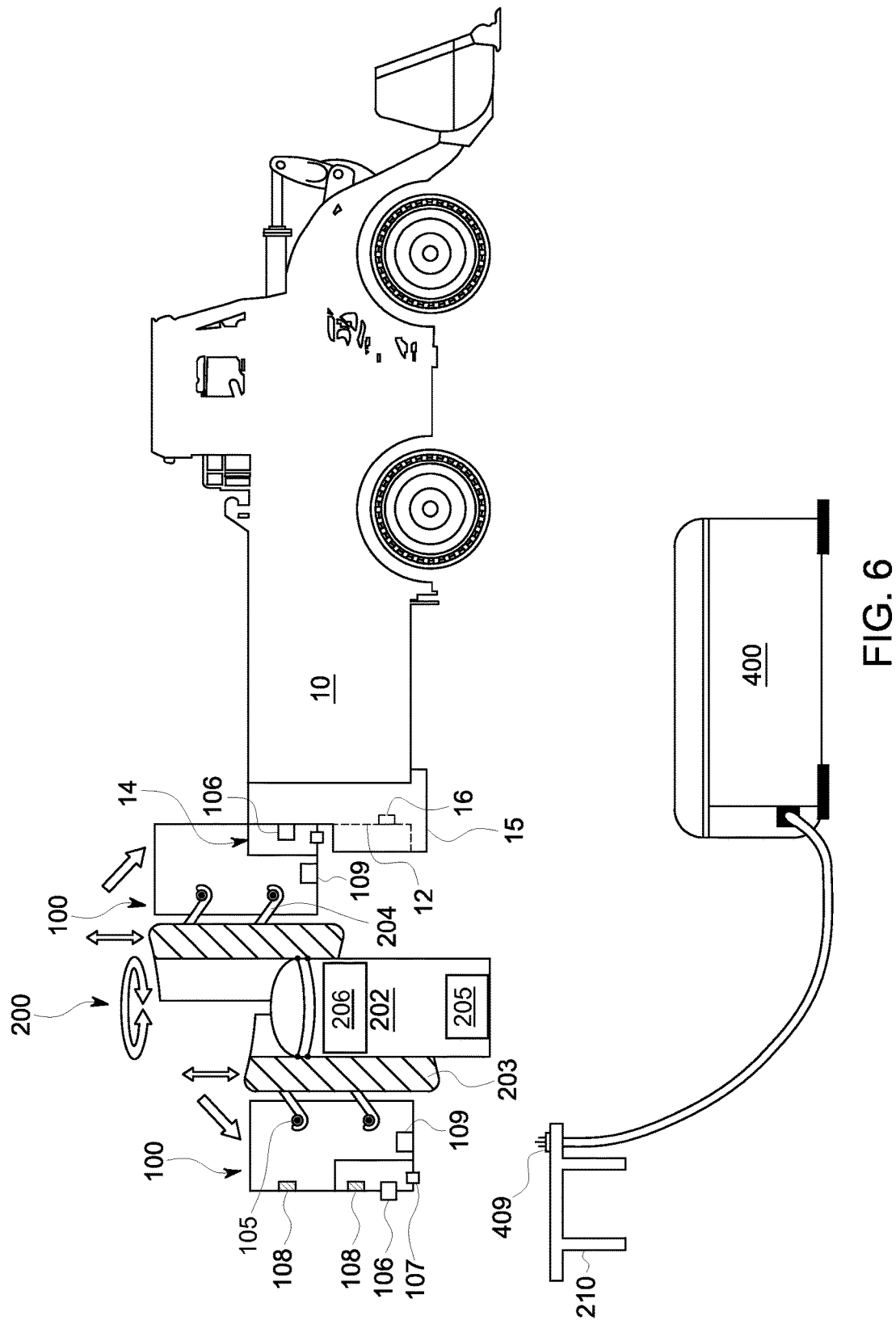
FIG. 6 is a side schematic view of the energy storage device, the coupling interface, and the energy storage device exchange apparatus of FIG. 4 in combination with a remote recharge apparatus according to another embodiment of the invention.

Referring now to FIG. 6, the energy storage device receptacle 210 may alternately be provided with a recharge connector 409 that is positioned and configured to matingly engage with the recharge connector 109 of the energy storage device 100, consequent to the energy storage device 100 being set down onto or into the energy storage device receptacle 210. Such a recharge connector 409 may be powered or supplied from a remote charger apparatus 400, generally similar to the rapid opportunity charger apparatus 300 as described with reference to FIG. 5. However, in place of having a coupling interface 11 directly mounted as illustrated for the rapid opportunity charger apparatus 300, the remote charger apparatus 400 is provided with a cable or hose or other flexible conduit (see, e.g., conduit 412 in FIG. 8) connecting it with the recharge connector 409. Thus, the remote charger apparatus 400 can be disposed at a location distant from the recharge connector 409. Therefore, it may be feasible for the remote charger apparatus 400 to be powered other than by a zero-emission power source such as electrical current. For example, the remote charger apparatus 400 may incorporate any of: a combustion engine; an open-cycle fuel cell; solar, wind, or hydro-power; a fission or fusion reactor; or the like.

Figure 7:
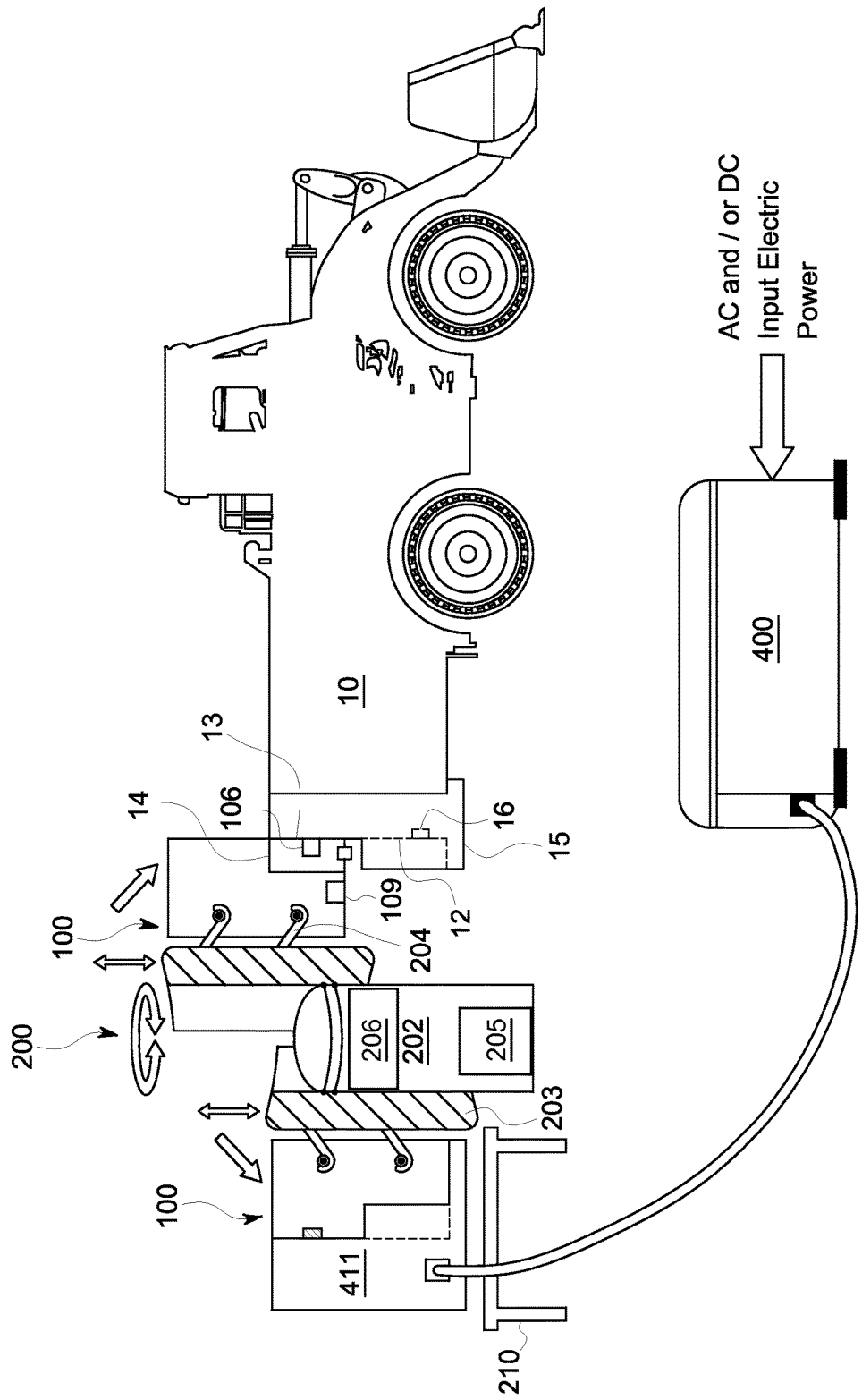
FIG. 7 is a side schematic view of the energy storage device, the coupling interface, the energy storage device exchange apparatus, and the remote recharge apparatus of FIG. 6 in combination with a recharge coupling interface according to another embodiment of the invention.

FIGS. 7-8 illustrate a system in which the remote charger apparatus 400 is provided in combination with a recharge coupling interface 411, which is generally similar to the coupling interface 11 as discussed above with reference to FIG. 1. By positioning the recharge coupling interface 411 adjacent to the energy storage device receptacle 210, it is thereby possible for the energy storage device exchange apparatus 200 to deposit a depleted energy storage device 100 from a vehicle coupling interface 11 into the recharge coupling interface 411, or to pick up a charged energy storage device 100 from the recharge coupling interface 411 for installation onto a vehicle coupling interface 11.

Figure 9:
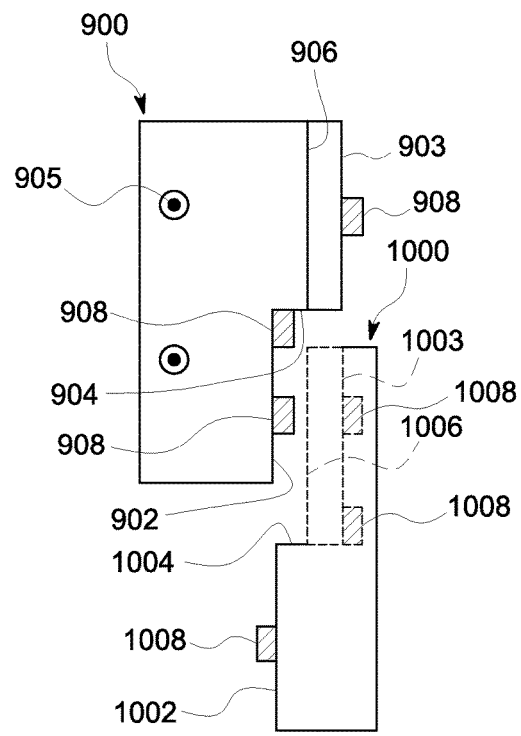
FIG. 9 is a side schematic view of an energy storage device and a coupling interface according to another embodiment of the invention.
Figures 10, 11:
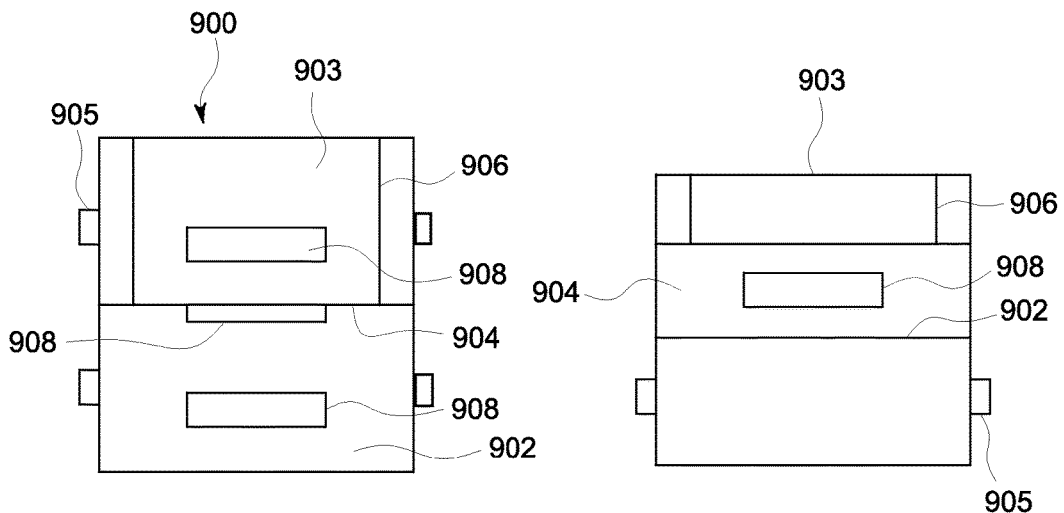
FIG. 10 is a front schematic view of the energy storage device and the coupling interface of FIG. 9.
FIG. 11 is bottom schematic view of the energy storage device and the coupling interface of FIG. 9.

FIGS. 9-11 show side, front, and top views of an energy storage device 900 and a coupling interface 1000, according to another embodiment of the invention. The recharge coupling interface 411 may be similarly configured. The energy storage device 900 has a coupling interface that includes a generally planar first surface 902, a generally planar second surface 903 that is offset outward from the first surface 902, and an intermediate surface 904 that is shaped as a ledge inclined toward the first surface 902. The coupling interface 1000 has complementary surfaces that include a generally planar first surface 1002, a generally planar second surface 1003, and an intermediate surface 1004 that is shaped as a ledge inclined toward the second surface 1003. The energy storage device 900 includes lifting structures 905 that are compatible with the carriers 203 as illustrated in FIGS. 4, 7, and 8, although other lifting structure and carrier shapes could be equally suitable. The energy storage device 900 and the coupling interface 1000 respectively include energy transfer connectors 908, 1008, which are provided in each of the first, second, and intermediate surfaces. Notably, the mating intermediate surfaces 904, 1004 can substantially serve at least one purpose of the detent slot 16 and detent tab 106 as discussed above with reference to FIGS. 1-3, that is, engagement of the inclined ledges can prevent unintended displacement of the energy storage device 900 from its installed position on the coupling interface 1000.

As used herein, the terms "substantially," "generally," and "about" indicate conditions within reasonably achievable manufacturing and assembly tolerances, relative to ideal desired conditions suitable for achieving the functional purpose of a component or assembly.

Although the complementary first surfaces 902, 1002; second surfaces 903, 1003; and intermediate surfaces 904, 1004 are described and shown in the drawing figures as flat, "generally planar" also may describe cylindrical curved shapes of relatively large radius, such that the energy storage device exchange apparatus 200 may be engaged with the lifting structures 905 and may rotate the energy storage device 900 away from the coupling interface 1000 with only a minimal lifting motion. However, in case the complementary surfaces of the energy storage device 900 and of the coupling interface 1000 are indeed flat as shown, then in most embodiments the offset between the first and second surfaces 902, 903 should allow for the energy storage device exchange apparatus 200 to rotate the energy storage device 900 away from the coupling interface 1000, after lifting the energy storage device 900 only partway along a height of the coupling interface 1000. Thus, again, the energy storage device exchange apparatus 200 can move the carrier 203 upward along the working axis in a first motion to bring the first device surface 902 away from the first interface surface 1002, across the second interface surface 1003; then pivot the carrier 203 around the working axis in a second motion that is generally orthogonal to the first motion and displaces the first device surface 902 from the second interface surface 1003.

Figure 12:
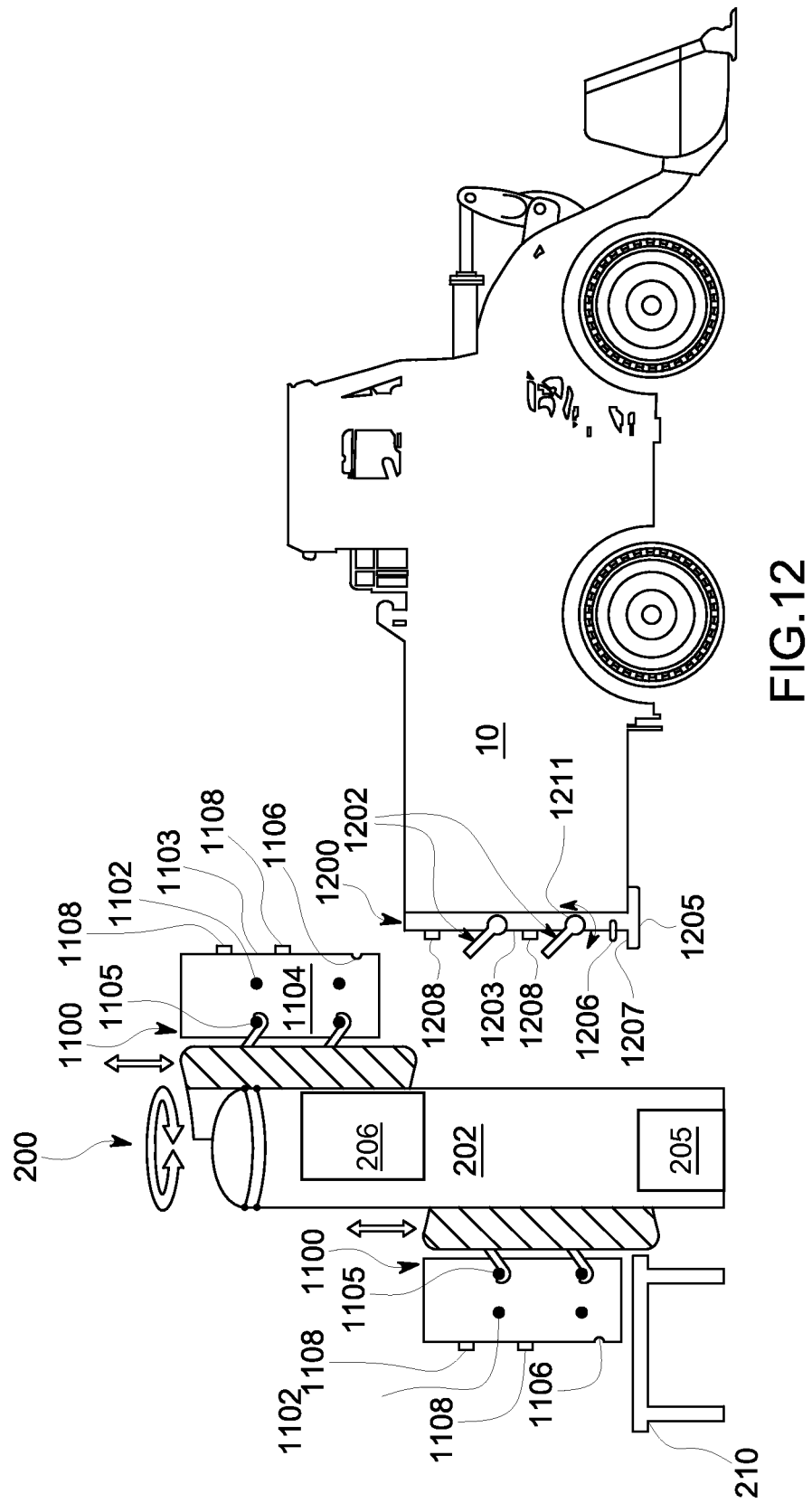
FIG. 12 is a side schematic view of an energy storage device and a coupling interface according to another embodiment of the invention.

FIG. 12 shows in side view an energy storage device 1100 that is installable onto a coupling interface 1200, which is mounted to the vehicle 10. The energy storage device 1100 has generally convex first surfaces 1102, formed as pins that protrude from lateral sides of the energy storage device. In an installed position of the energy storage device 1100, each of its first surfaces 1102 rests on a generally concave or inclined first surface 1202 of the coupling interface 1200. The first surfaces 1202 of the coupling interface 1200 are formed at upper sides of pivotal arms 1211, which project vehicle-rearward beyond a generally planar second surface 1203 of the coupling interface 1200.

Figure 13:
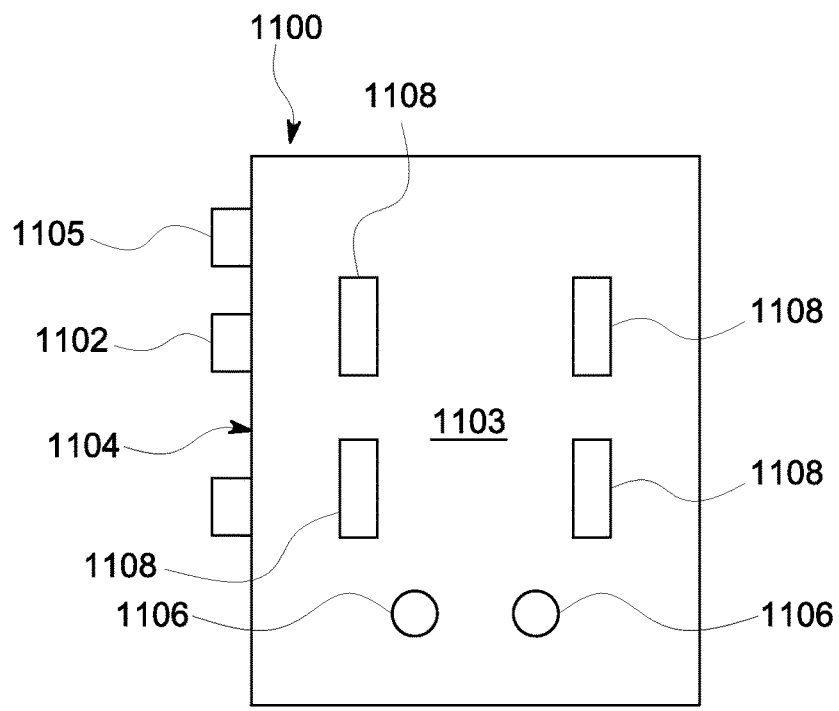
FIG. 13 is a front schematic view of the energy storage device of FIG. 12.

Referring also to FIG. 13, the energy storage device 1100 has a generally planar second surface 1103, which is complementary to the second surface 1203. The energy storage device 1100 has lateral outer sides 1104 that serve as intermediate surfaces connecting the first surfaces 1102 with the second surface 1103. Additionally, the energy storage device 1100 includes lifting structures 1105 (e.g., of a shape compatible with the carrier 203 as discussed above). The energy storage device 1100 also has energy transfer connectors 1108 that are disposed on or formed in the second surface 1103.

Figure 14:
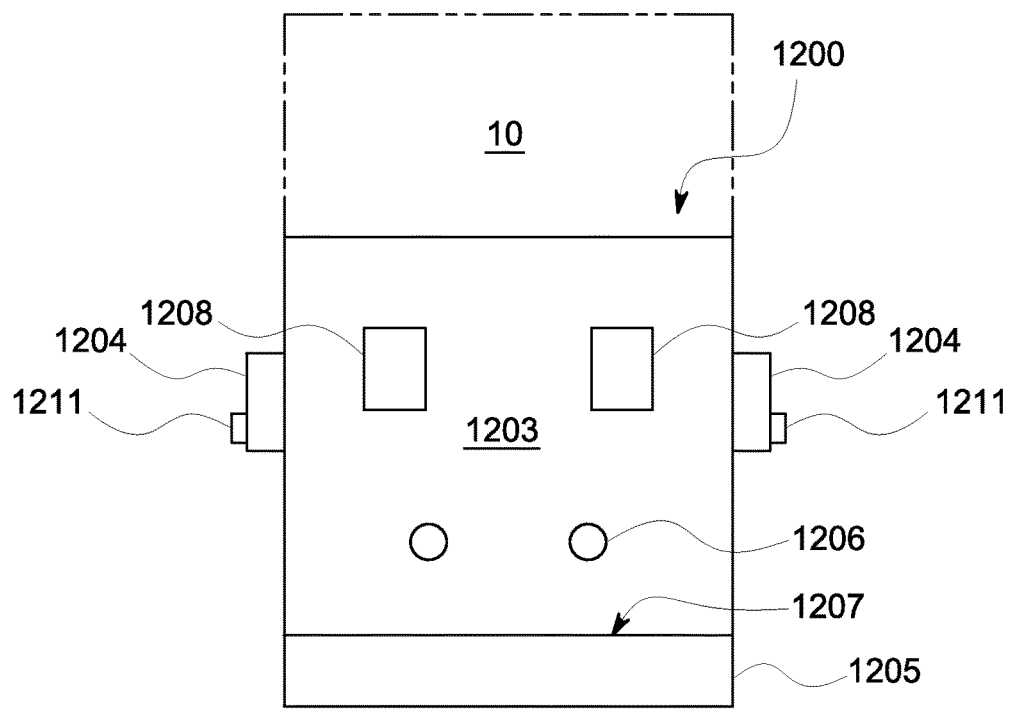
FIG. 14 is a front schematic view of the coupling interface of FIG. 12.

Referring also to FIG. 14, the arms 1211 of the coupling interface 1200 have laterally inward surfaces 1204, which serve as movable intermediate surfaces that connect the first surfaces 1202 with the second surface 1203. Additionally, the coupling interface 1204 also includes a foot 1205, which provides an upward-facing ledge 1207 on which the energy storage device 1100 can rest when installed into the coupling interface. Furthermore, the coupling interface 1200 includes energy transfer connectors 1208 that are formed in or disposed on the second surface 1203, such that when the energy storage device 1100 is installed onto the coupling interface 1200, the energy transfer connectors 1108, 1208 become matingly engaged.

The coupling interface 1200 also includes a detent pin or tab 1206, which is extendable and retractable and into the generally planar surface 1203. The detent tab 1206 is configured and positioned to matingly engage with a complementary hole or slot 1106 that is formed in the generally planar surface 1103, when the energy storage device 1100 is in an installed position on the coupling interface 1200.

With reference to the energy storage device exchange apparatus 200 as shown in FIG. 4, and referring again to FIG. 12, it is apparent that the generally planar shapes of the complementary second surfaces 1103, 1203, in combination with the engaging pins 1102 and arms 1211, will require the energy storage device exchange apparatus 200 to lift the energy storage device 1100 the full height of the coupling interface 1200 in order to permit rotation from the removal position to the deposit position adjacent the energy storage device receptacle 210.

In embodiments, the central pillar is generally stationary, and the carrier or carriers are configured to move both generally parallel to (e.g., up and down) and around a generally vertical working axis defined by the pillar. In other embodiments, as mentioned, the carrier or carriers are vertically fixed relative to an outer portion of the pillar, which instead is configured to move vertically and rotationally. For example, the pillar may include a fixed base, an outer sleeve that is configured to move up and down relative to the base (for example, a post-like portion of the base may be received in a central bore or recess defined by the sleeve), and a lifting device, such as a hydraulic or pneumatic cylinder, that is configured to move the sleeve relative to the fixed base. The pillar may also include an internal drive (e.g., gear system), operably driven by a motor, for rotating the sleeve relative to the fixed base. The carrier or carriers are fixed to the outer portion, and are moved, to exchange energy storage devices for a vehicle, by the controller controlling operation of the motor and lifting device to lift, lower, and rotate the sleeve and thereby the carrier or carriers.

Embodiments of the invention provide an apparatus that includes a central pillar; a first carrier that is mounted on the central pillar for motion generally parallel to and around a generally vertical working axis, and that is configured to engage a lifting structure of an energy storage device; at least one motor; and a controller configured to operate with the at least one motor to: rotate the first carrier around the working axis to a removal position adjacent the lifting structure of a vehicle-mounted energy storage device; engage the first carrier with the lifting structure and lift the energy storage device generally along the working axis; rotate the carrier around the working axis to a deposit position adjacent an energy storage device receptacle; and lower the first carrier generally along the working axis to deposit the energy storage device at the energy storage device receptacle. In certain embodiments the apparatus may include least one second carrier that is mounted on the central pillar at a position circumferentially spaced from the first carrier and for motion generally parallel to and around the working axis, and the controller may be further configured to operate with the at least one motor to: rotate the second carrier around the working axis to a pickup position adjacent the energy storage device receptacle; engage the second carrier with a lifting structure of a replacement energy storage device and lift the replacement energy storage device generally along the working axis; rotate the second carrier around the working axis to an install position adjacent the vehicle; and lower the second carrier generally along the working axis to install the replacement energy storage device onto the vehicle. In some embodiments, the controller may be configured to synchronize movement of the first and second carriers. The controller may include a mechanical transmission connected to coordinate rotating, raising, and lowering motions of the first and second carriers. In some embodiments, the energy storage device receptacle may include a coupling interface that includes a first surface of a first shape, a second surface of a different shape from the first surface, and an intermediate surface connecting the first and second surfaces, with at least one first energy transfer connector formed in or disposed on one of the first, second, or intermediate surfaces. For example, the second surface of the coupling interface may be a generally planar vertical surface, the first surface of the coupling interface may be a generally concave cylindrical vertical surface disposed below the second surface and at such a radius from the working axis, such that the first surface of the coupling interface meets the second surface of the coupling interface in tangent fashion, and the intermediate surface of the coupling interface may include ledges protruding generally horizontally from lower edges of the generally planar second surface to respective vertices of the concave cylindrical first surface, such that the coupling interface accommodates receipt of an energy storage device from the first carrier, and connection of the energy storage device to the first energy transfer connection, by a sequence of rotating the energy storage device around the working axis and then lowering the energy storage device along the working axis, and accommodates removal of the energy storage device by the first carrier, and disconnection of the energy storage device from the first energy transfer connection, by a sequence of lifting the energy storage device along the working axis and the rotating the energy storage device around the working axis. In certain embodiments, the first carrier may include a portion that is extensible away from the working axis for engaging the lifting structure of the energy storage device. In some embodiments, the energy storage device exchange apparatus can move a carrier upward along a generally vertical working axis in a first motion to bring a first device surface away from a first interface surface, across a second interface surface; then pivot the carrier around the working axis in a second motion that is generally orthogonal to the first motion and displaces the first device surface from the second interface surface.

Other embodiments of the invention provide an energy storage device coupling apparatus includes a coupling interface, mounted to a vehicle, that includes a first interface surface having a first shape, a second interface surface having a different shape from the first surface, and an intermediate interface surface connecting the first and second surfaces, with at least one first energy transfer connector formed in or disposed on one of the first, second, or intermediate interface surfaces. The coupling interface is configured to allow an automated energy storage device exchange apparatus external to the vehicle to remove or install matingly an energy storage device having device surfaces that matingly correspond to the coupling interface surfaces, such that the energy storage device may be electrically disengaged and removed from the coupling interface via a first motion that brings the first device surface adjacent to the second interface surface, followed by a second motion that is generally orthogonal to the first motion. In certain embodiments, the second interface surface is generally planar; the first interface surface is generally concave cylindrical about a generally vertical axis, which is offset from the second interface surface such that the first and second interface surfaces meet in tangent fashion; and the intermediate interface surface includes ledges protruding generally orthogonally from the second interface surface to lateral vertices of the first interface surface. The second interface surface may be above the first interface surface. In certain other embodiments, the second interface surface is generally planar, the first interface surface is generally planar and is protruded outward from the second interface surface, and the intermediate interface surface is a ledge tilted toward the second surface of the coupling interface. In certain other embodiments, the second interface surface is generally planar and generally vertical; the first interface surface is formed at an upper side of an arm projecting outwardly upward with reference to the second interface surface, and the first energy transfer connectors are formed in or disposed on the second interface surface. However, the first energy transfer connector may be formed on or disposed in the intermediate interface surface, or may include plural energy transfer connectors that are formed on or disposed in the first and second interface surfaces. Certain embodiments may also include the energy storage device, wherein at least one detent slot is formed in one of the complementary surfaces of one of the coupling interface or of the energy storage device, and a detent tab is retractably protruded from the corresponding one of the complementary surfaces of the other of the coupling interface or of the energy storage device. For example, the detent tab may retractably protrude from one of the complementary surfaces of the energy storage device, which may also include an actuator operable to cause the detent tab to retract or to protrude. For example, such an actuator may link an energy storage device lifting structure to the detent tab to cause the detent tab to retract in response to an upward force exerted on the lifting structure; and/or such an actuator may be linked to the detent tab to cause the detent tab to protrude in response to an upward force exerted on a downward-facing surface of the energy storage device. Also, in case the detent tab retractably protrudes from one of the complementary surfaces of the energy storage device, then the coupling interface may include adjacent the detent slot an actuator for pushing the detent tab out of the detent slot. In some embodiments, the respective shapes of the first and second interface surfaces and their complementary device surfaces permit an energy storage device exchange apparatus to move an energy storage device upward along a generally vertical working axis in a first motion to bring a first device surface away from the first interface surface, across the second interface surface; then pivot the energy storage device around the working axis in a second motion that is generally orthogonal to the first motion and displaces the first device surface from the second interface surface.

Other embodiments provide an apparatus for energy storage device exchange and charging, which includes a charging stand that includes a recharge connector for connecting an energy storage device to a power source, consequent to depositing the energy storage device onto the charging stand; a central pillar, adjacent the charging stand, that has a generally vertical working axis; a first carrier that is movably mounted on the central pillar, is reciprocally movable generally parallel the generally vertical axis of the central pillar, and is configured to engage a lifting structure of an energy storage device; a second carrier that is movably mounted on the central pillar at a location circumferentially displaced from the first carrier, is reciprocally movable generally parallel the generally vertical axis of the central pillar, and is configured to engage a lifting structure of an energy storage device; at least one motor; and a controller configured to operate with the at least one motor to: rotate the first carrier to a pickup position adjacent a lifting structure of a first energy storage device mounted at the charging stand; rotate the second carrier to a removal position adjacent a lifting structure of a second energy storage device mounted on a vehicle; engage the first carrier with the lifting structure of the first energy storage device and engage the second carrier with the lifting structure of the second energy storage device; lift the first and second carriers to respectively pick up the first energy storage device from the charging stand and remove the second energy storage device from the vehicle; rotate the first carrier to an install position adjacent the vehicle and rotate the second carrier to a deposit position adjacent the charging stand; and lower the first and second carriers to respectively install the first energy storage device onto the vehicle and deposit the second energy storage device onto the recharge connector of the charging stand.

In embodiments, the apparatus works fully automatically, e.g., the presence of a vehicle is sensed by a sensor, which outputs a corresponding signal to a controller for controlling the carrier(s), etc. to exchange a depleted energy storage device onboard the vehicle for a charged energy storage device, without human operation. In other embodiments, the apparatus works semi-automatically, meaning, for example, operation is initiated by a human operator, or the apparatus includes controls for a human operator to control the lowering, raising, and rotational movement of the carrier(s). In other embodiments, the apparatus includes selectable automatic and semi-automatic modes of operation.

In embodiments, a vehicle in which an energy storage device is carried is electric only, with the energy storage device (or possibly multiple energy storage devices) being the only source of traction power (i.e., power for moving the vehicle). In other embodiments, a vehicle in which an energy storage device is carried lacks any internal combustion engines, that is, there is no internal combustion engine on board the vehicle. In other embodiments, a vehicle may include an internal combustion engine, with the energy storage device providing, in at least one mode of operation, traction power. In other embodiments, a vehicle includes an energy storage device for traction power and an internal combustion engine for generating electricity to recharge the battery on-board and/or to directly drive one or more traction motors of the vehicle.

In embodiments, a vehicle includes a coupling interface positioned on an outer surface (e.g., rear) of the vehicle. The coupling interface is configured to receive an energy storage device for electrical and mechanical coupling to the vehicle. When the energy storage device is coupled to the vehicle by way of the coupling interface, at least part of the energy storage device lies outside the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. An apparatus comprising:
   a central pillar;
   a first carrier that is mounted on the central pillar for motion around a generally vertical working axis, and that is configured to engage a lifting structure of an energy storage device;
   at least one motor; and
   a controller configured to operate with the at least one motor to: rotate the first carrier around the working axis to a removal position adjacent to the lifting structure of the energy storage device mounted on a vehicle; engage the first carrier with the lifting structure and lift the energy storage device generally along the working axis; rotate the first carrier around the working axis to a deposit position adjacent to an energy storage device receptacle; and lower the first carrier generally along the working axis to deposit the energy storage device at the energy storage device receptacle.

2. The apparatus of claim 1, further comprising a second carrier that is mounted on the central pillar at a position circumferentially spaced from the first carrier and used for motion around the working axis,
   wherein the controller is further configured to operate with the at least one motor to: rotate the second carrier around the working axis to a pickup position adjacent to the energy storage device receptacle; engage the second carrier with a lifting structure of a replacement energy storage device and lift the replacement energy storage device generally along the working axis; rotate the second carrier around the working axis to an install position adjacent to the vehicle; and lower the second carrier generally along the working axis to install the replacement energy storage device onto the vehicle.

3. The apparatus of claim 2, wherein the controller is configured to synchronize movement of the first carrier and the second carrier.

4. The apparatus of claim 2, wherein the controller includes a mechanical transmission connected to coordinate rotating, raising, and lowering motions of the first carrier and the second carrier.

5. The apparatus of claim 1, wherein the energy storage device receptacle comprises a coupling interface that includes a first surface of a first shape, a second surface of a different shape from the first surface, and an intermediate surface connecting the first surface and the second surface, with at least one first energy transfer connector formed in or disposed on at least one of the first surface, the second surface, or the intermediate surface,
wherein the second surface of the coupling interface is a generally planar vertical surface,
wherein the first surface of the coupling interface is a generally concave cylindrical vertical surface disposed below the second surface and at a radius from the working axis such that the first surface of the coupling interface meets the second surface of the coupling interface in a tangent fashion, and
the intermediate surface of the coupling interface includes ledges protruding generally horizontally from lower edges of the generally planar vertical surface of the second surface to respective vertices of the generally concave cylindrical vertical surface of the first surface,
wherein the coupling interface accommodates receipt of the energy storage device from the first carrier, and connection of the energy storage device to said at least one energy transfer connector, by a sequence of rotating the energy storage device around the working axis and then lowering the energy storage device along the working axis, and accommodates removal of the energy storage device by the first carrier, and disconnection of the energy storage device from said at least one energy transfer connector, by a sequence of lifting the energy storage device along the working axis and then rotating the energy storage device around the working axis.

6. The apparatus of claim 1, wherein the first carrier includes a portion extensible away from the working axis for engaging the lifting structure of the energy storage device.

7. An apparatus comprising:
a coupling interface, mounted to a vehicle, that includes a first interface surface having a first shape, a second interface surface having a different shape from the first interface surface, and an intermediate interface surface connecting the first interface surface and the second interface, with at least one first energy transfer connector formed in or disposed on at least one of the first interface surface, the second interface surface, or the intermediate interface surface;
wherein the coupling interface is configured for an energy storage device exchange apparatus external to the vehicle to remove and install an energy storage device having device surfaces that matingly correspond to the first interface surface, the second interface surface or the intermediate interface surface of the coupling interface, such that the energy storage device can be electrically disengaged and removed from the coupling interface via a first motion that brings a first device surface of the device surfaces adjacent to the second interface surface, followed by a second motion that is generally orthogonal to the first motion.

8. The apparatus of claim 7, wherein:
the second interface surface is generally planar;
the first interface surface is generally concave cylindrical about a generally vertical axis, which is offset from the second interface surface such that the first interface surface and second interface surface meet in a tangent fashion; and
the intermediate interface surface includes ledges protruding generally orthogonally from the second interface surface to lateral vertices of the first interface surface.

9. The apparatus of claim 8, wherein the second interface surface is above the first interface surface.

10. The apparatus of claim 7, wherein:
the second interface surface is generally planar,
the first interface surface is generally planar and is protruded outward from the second interface surface, and
the intermediate interface surface is a ledge tilted toward the second interface surface of the coupling interface.

11. The apparatus of claim 7, wherein:
the second interface surface is generally planar and generally vertical;
the first interface surface is formed at an upper side of an arm projecting outwardly upward with reference to the second interface surface, and
at least one of said at least one first energy transfer connector is formed in or disposed on the second interface surface.

12. The apparatus of claim 7, wherein the first energy transfer connector is formed on or disposed in the intermediate interface surface.

13. The apparatus of claim 7, wherein said at least one first energy transfer connector includes plural energy transfer connectors with at least one formed on or disposed in the first and second interface surfaces.

14. The apparatus of claim 7, wherein at least one detent slot is formed in one of complementary surfaces of one of the coupling interface or the energy storage device, and a detent tab is retractably protruded from a corresponding one of the complementary surfaces of the coupling interface or the energy storage device.

15. The apparatus of claim 14, wherein the detent tab, which retractably protrudes from one of the complementary surfaces of the energy storage device, comprises an actuator operable to cause the detent tab to retract or to protrude.

16. The apparatus of claim 15, wherein the actuator links an energy storage device lifting structure to the detent tab to cause the detent tab to retract in response to an upward force exerted on the energy storage device lifting structure.

17. The apparatus of claim 15, wherein the actuator is linked to the detent tab to cause the detent tab to protrude in response to an upward force exerted on a downward-facing surface of the energy storage device.

18. The apparatus of claim 17, wherein the actuator links an energy storage device lifting structure to the detent tab to cause the detent tab to retract in response to an upward force exerted on the energy storage device lifting structure.

19. The apparatus of claim 15, wherein the detent tab retractably protrudes from one of the complementary surfaces of the energy storage device, and the coupling interface includes an actuator adjacent to said at least one detent slot for pushing the detent tab out of said at least one detent slot.

20. An apparatus comprising:
a charging stand that includes at least one recharge connector for connecting at least one of a first energy storage device or a second energy storage device to a power source, consequent to depositing the first energy storage device or the second energy storage device onto the charging stand;
a central pillar, adjacent to the charging stand, that has a generally vertical working axis;
a first carrier that is movably mounted on the central pillar for rotation around the working axis of the central pillar, and configured to engage lifting structures of the first energy storage device and the second energy storage device;
a second carrier that is movably mounted on the central pillar at a location circumferentially displaced from the first carrier for rotation around the axis of the central pillar, and configured to engage the lifting structures of the energy storage devices;
at least one motor; and
a controller configured to operate with the at least one motor to: rotate the first carrier to a pickup position adjacent to the lifting structure of the first energy storage device mounted at the charging stand; rotate the second carrier to a removal position adjacent to the lifting structure of the second energy storage device mounted on a vehicle; engage the first carrier with the lifting structure of the first energy storage device and engage the second carrier with the lifting structure of the second energy storage device; lift the first carrier and the second carrier to respectively pick up the first energy storage device from the charging stand and remove the second energy storage device from the vehicle; rotate the first carrier to an install position adjacent to the vehicle and rotate the second carrier to a deposit position adjacent to the charging stand; and lower the first carrier and the second carrier to respectively install the first energy storage device onto the vehicle and deposit the second energy storage device onto the recharge connector of the charging stand.

21. The apparatus of claim 20, wherein each of the first carrier and the second carrier is reciprocally movable generally parallel to the working axis.

\* \* \* \* \*